United States Patent
Tan

(10) Patent No.: US 8,521,714 B2
(45) Date of Patent: Aug. 27, 2013

(54) PEER TO PEER SEARCH ROUTING ALGORITHM

(75) Inventor: Zhenhua Tan, Liaoning (CN)

(73) Assignee: Northeastern University Technology Transfer Center, Liaoning (CN)

( * ) Notice: Subject to any disclaimer, the term of this patent is extended or adjusted under 35 U.S.C. 154(b) by 84 days.

(21) Appl. No.: 13/265,229

(22) PCT Filed: Aug. 25, 2010

(86) PCT No.: PCT/CN2010/076348
§ 371 (c)(1),
(2), (4) Date: Oct. 19, 2011

(87) PCT Pub. No.: WO2012/024834
PCT Pub. Date: Mar. 1, 2012

(65) Prior Publication Data
US 2012/0130985 A1    May 24, 2012

(51) Int. Cl.
*G06F 17/30*   (2006.01)
(52) U.S. Cl.
USPC ........... 707/706; 707/722; 707/736; 707/758; 707/781; 707/822
(58) Field of Classification Search
USPC ................................................. 707/600–899
See application file for complete search history.

(56) References Cited

U.S. PATENT DOCUMENTS 7,379,428 B2 * 5/2008 Xu et al. ................... 370/254
2009/0164576 A1 6/2009 Noh

OTHER PUBLICATIONS

Frank Dabek, Emma Brunskill, M. Frans Kaashoek, David Karger, Robert Morris, Ion Stoica, Hari Balakrishnan, Building Peer-to-Peer Systems With Chord, a Distributed Lookup Service, MIT Laboratory for Computer Science, 2001, pp. 1-6.
Quanqing Xu et al., A HIT-Based Semantic Search Approach in Unstructured P2P Systems, Acta Scientiarum naturalium Universitatis Pekinensis, Jan. 2010, pp. 18-20, vol. 46- No. 1.
Xuhui Cao, Hybrid P2P Routing Algorithm, Journal of Jimei University (Natural Science), Jul. 2009, pp. 315-317, vol. 14- No. 3.
Chongguo Fu et al., Peer-to-peer Based Personalized Web Information Retrieval, Journal of Computer Applications, Jan. 2010, pp. 114-115, vol. 30- No. 1.
Zhenhua Tan et al., A New Routing Algorithm of Structured Peer-to-Peer Overlay Networks, Journal of Northeastern University (Natural Science), Feb. 2009, pp. 195-196, vol. 30- No. 2.

(Continued)

*Primary Examiner* — Isaac M Woo
(74) *Attorney, Agent, or Firm* — Moritt Hock & Hamroff LLP; Steven S. Rubin, Esq.

(57) ABSTRACT

Technologies are generally described for a peer to peer search routing algorithm and system. In one example, a node in a peer to peer network includes a processor. In some examples, the processor may be configured to receive information regarding a topology of the peer to peer network and generate a first search routing algorithm for the peer to peer network based on the topology. In some examples, the processor may be configured to generate a second search routing algorithm for the peer to peer network based on a search characteristic and the topology. In some examples, the second search routing algorithm is distinct from the first search routing algorithm. In some examples, the processor may be configured to receive a request to search the peer to peer network. In some examples, the processor may be configured to search the peer to peer network using the second search routing algorithm.

20 Claims, 4 Drawing Sheets

(56) References Cited

OTHER PUBLICATIONS

International Search Report and Written Opinion for application with U.S. Appl. No. 13/265,229 dated Jun. 2, 2011.

Small, T. et al., "On Optimal Peer-to-Peer Topology Construction with Maximum Peer Bandwidth Contributions," Communications, 2006 23rd Biennial Symposium on, 2006, pp. 157-160.

* cited by examiner

PEER TO PEER SEARCH ROUTING ALGORITHM

CROSS REFERENCE TO RELATED APPLICATIONS

This application is a 371 of International Application No. PCT/CN2010/076348 filed Aug. 25, 2010, the entirety of which is hereby incorporated by reference.

BACKGROUND

Unless otherwise indicated herein, the materials described in this section are not prior art to the claims in this application and are not admitted to be prior art by inclusion in this section.

A network may include nodes in communication with each other though communication links. The links could be wired or wireless. Nodes may include, for example, computer processors, entities in a social network, web pages, peer citation networks, elements in transportation networks, etc. A node may include one or many machines. One machine could include one or many nodes. In a peer to peer or distributed architecture network, each node can both store data that may be searched by other nodes and can search data stored in other nodes.

SUMMARY

In an example, a method in a peer to peer network is described. In some examples, the method includes receiving, by a processor, information regarding a topology of the peer to peer network. In some examples, the method includes generating, by the processor, a first search routing algorithm for the peer to peer network based on the topology. In some examples, the method includes generating, by the processor, a second search routing algorithm for the peer to peer network based on a search characteristic and the topology. In some examples, the second search routing algorithm is distinct from the first search routing algorithm.

In an example, a node in a peer to peer network is described. In some examples, the node includes a memory and a processor in communication with the memory. In some examples, the processor is effective to receive information regarding a topology of the peer to peer network. In some examples, the processor is effective to generate a first search routing algorithm for the peer to peer network based on the topology. In some examples, the processor is effective to store the first search routing algorithm in the memory. In some examples, the processor is effective to generate a second search routing algorithm for the peer to peer network based on a search characteristic and the topology. In some examples, the second search routing algorithm is distinct from the first search routing algorithm. In some examples, the processor is effective to store the second search routing algorithm in the memory.

In some examples, a peer to peer network is described. In some examples, the peer to peer network includes a first node, a second node, and a third node. In some examples, the first node includes a first memory and a first processor in communication with, the first memory. In some examples, the first processor is effective to receive information regarding a topology of the peer to peer network. In some examples, the first processor is effective to generate a first search routing algorithm for the peer to peer network based on the topology. In some examples, the first processor is effective to store the first search routing algorithm in the first memory. In some examples, the first processor is effective to generate a second search routing algorithm for the peer to peer network based on a first search characteristic and the topology. In some examples, the second search routing algorithm is distinct from the first search routing algorithm. In some examples, the first processor is effective to store the second search routing algorithm in the second memory. In some examples, the second node includes a second memory, and a second processor in communication with the second memory. In some examples, the second processor is effective to receive the information regarding the topology of the peer to peer network. In some examples, the second processor is effective to generate a third search routing algorithm for the peer to peer network based on the topology. In some examples, the second processor is effective to store the third search routing algorithm in the second memory. In some examples, the second processor is effective to generate a fourth search routing algorithm for the peer to peer network based on a second search characteristic and the topology. In some examples, the fourth search routing algorithm is distinct from the third search routing algorithm. In some examples, the second processor is effective to store the fourth search routing algorithm in the second memory. In some examples, the third node includes a third memory, and a third processor in communication with the third memory. In some examples, the third processor is effective to receive the information regarding the topology of the peer to peer network. In some examples, the third processor is effective to generate a fifth search routing algorithm for the peer to peer network based on the topology. In some examples, the third processor is effective to store the fifth search routing algorithm in the third memory. In some examples, the third processor is effective to generate a sixth search routing algorithm for the peer to peer network based on a third search characteristic and the topology. In some examples, the sixth search routing algorithm is distinct from the fifth search routing algorithm. In some examples, the third processor is effective to store the sixth search routing algorithm in the third memory.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
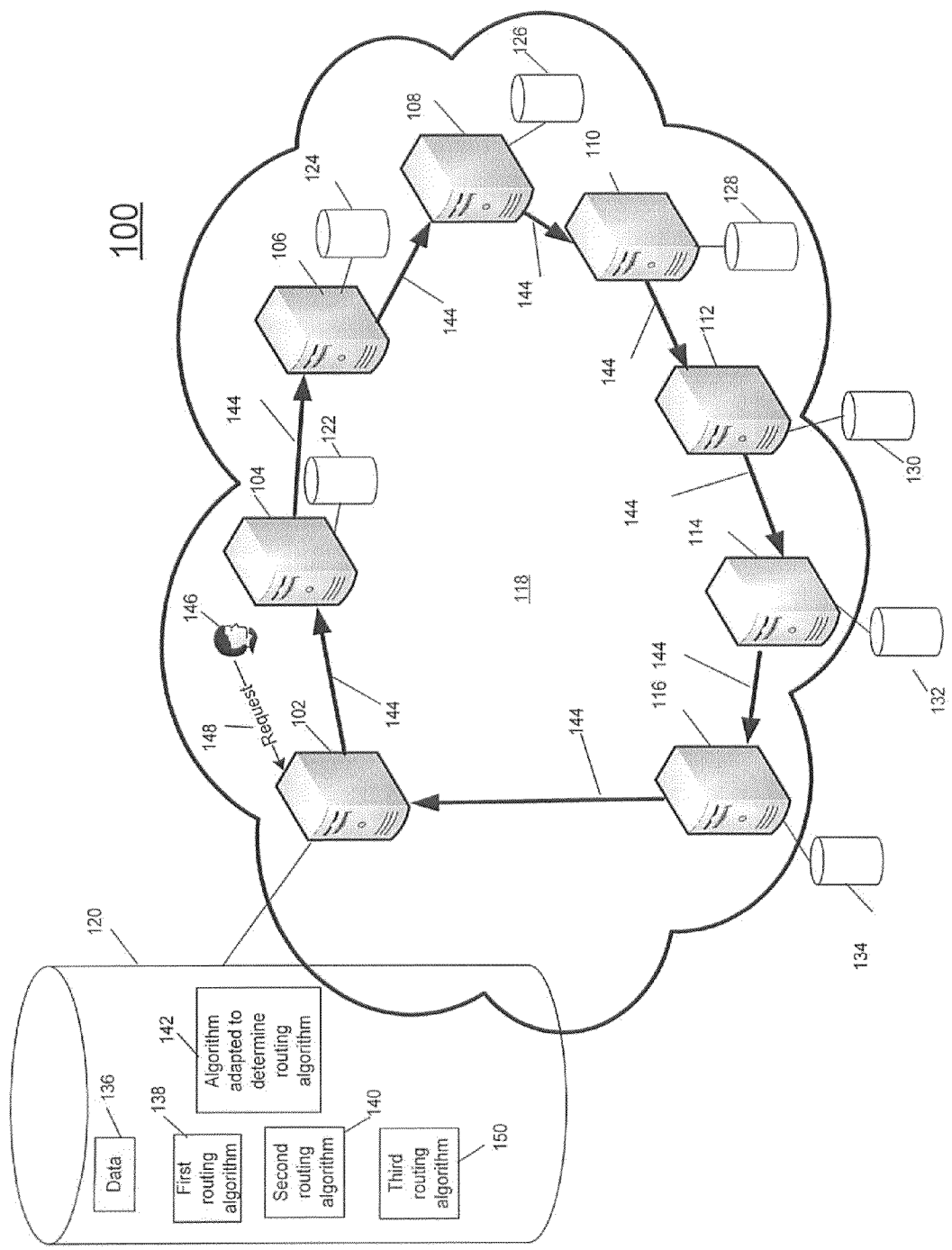
FIG. 1 illustrates some example systems that can be utilized to implement a peer to peer search routing algorithm.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to a peer to peer search routing algorithm.

Briefly stated, technologies are generally described for a peer to peer search routing algorithm and system. In one example, a node in a peer to peer network includes a processor. In some examples, the processor may be configured to receive information regarding a topology of the peer to peer network and generate a first search routing algorithm for the peer to peer network based on the topology. In some examples, the processor may be configured to generate a second search routing algorithm for the peer to peer network based on a search characteristic and the topology. In some examples, the second search routing algorithm is distinct from the first search routing algorithm. In some examples, the processor may be configured to receive a request to search the peer to peer network. In some examples, the processor may be configured to search the peer to peer network using the second search routing algorithm.

FIG. 1 illustrates some example systems that can be utilized to implement a peer to peer search routing algorithm in accordance with at least some embodiments described herein. In some examples, a system 100 may include nodes such as a node 102, a node 104, a node 106, a node 108, a node 110, a node 112, a node 114 and/or a node 116 all in communication over a network 118. In some examples, each node may be in communication with and/or include a memory. In the example shown, node 102 is in communication and/or includes a memory 120, node 104 is in communication and/or includes a memory 122, and node 106 is in communication and/or includes a memory 124. In the example shown, node 108 is in communication and/or includes a memory 126, node 110 is in communication and/or includes a memory 128, and node 112 is in communication and/or includes a memory 130. In the example shown, node 114 is in communication and/or includes a memory 132, and node 116 is in communication and/or includes a memory 134.

In the figure, some example contents of memory 120 are shown. Other memories 122, 124, 126, 128, 130, 132 and/or 134 may include some or all of the same contents as memory 120. In some examples, memory 120 may be adapted to include data 136, a first routing algorithm 138, a second routing algorithm 140, a third routing algorithm 150 and/or an algorithm adapted to determine routing algorithms 142. In some examples, data 136 may include data stored by a respective node. In some examples, node 102 may be configured to store data 136 using a distributed hash table mechanism. In some examples, first routing algorithm 138, second routing algorithm 140 and third routing algorithm 150 may be algorithms used by a respective node to search other nodes in network 118 for stored data 136. In some examples, and as is explained in more detail below, algorithm 142 may be adapted to generate first routing algorithm 138, second routing algorithm 140 and third routing algorithm 150.

Discussion below will be based, at least in part, on examples focusing on node 102 though any of nodes 104, 106, 108, 110, 112, 114 and/or 116 may be configured to perform similar processing. In an example, node 102 may be configured to receive a request 148 for data 136 that may be stored in one or more of the nodes 102, 104, 106, 108, 110, 112, 114 and/or 116. Request 148 may come from, for example, a human user 146, a processor and/or an algorithm. In some examples, node 102 may be configured to search network 118 for data 136 relating to request 148 using at least one of first routing algorithm 138, second routing algorithm 140 and/or third routing algorithm 150.

In an example, as a node leaves or enters network 118, node 102 may be configured to receive information regarding a topology of network 118. For example, the topology may indicate what nodes are part of network 118 and respective physical connections among the nodes. In an example, algorithm 142 may be adapted to generate first routing algorithm 138 based on the topology of network 118. In an example, first routing algorithm 138 may be adapted to instruct each node in network 118 to send request 148 to other nodes in network 118 along a path 144. In an example, algorithm 142 may be adapted to use a technique such as the CHORD or PASTRY technique to generate first routing algorithm 138. In an example, first routing algorithm 138 for node 102 may include the path 104-106-108-110-112-114-116 indicating that node 102 should search those respective nodes in that defined order until data relating to request 148 is found. Node 102 may be configured to search for data relating to request 148 in nodes in network 118 in an order defined by path 144.

In an example, algorithm 142 may be adapted to generate second routing algorithm 140 based on the topology. In an example, node 102 may be configured to search network 118 for data relating to request 148 using second routing algorithm 140. In some examples, algorithm 142 may be adapted to generate second routing algorithm 140 based on a search characteristic. For example, a search characteristic based on delay, user interest, a cluster of search interests, quality, etc. could be used.

In an example, the search characteristic may be based on a delay in communicating from a particular node to other nodes in network 118. In the example, algorithm 142 may be adapted to instruct node 102 to send delay requests to nodes in network 118. Based, at least in part, on responses from nodes in network 118 to the delay requests, node 102 may be configured to determine relative communication delays between node 102 and other nodes in network 118. Based, at least in part, on the communication delays, algorithm 142 may be adapted to generate second routing algorithm 140. For example, node 102 may determine that node 106 provides a quicker response to a delay request from node 102 than node 104. In the example, algorithm 142 may be adapted to generate second routing algorithm 140 for node 102 to include the path 106-104-108-110-112-114-116. In the example, using second routing algorithm 140, node 102 may be configured to search nodes which provide a faster response time prior to nodes with longer response times.

In some examples, the search characteristic may relate to a user's interest. In some examples, the search characteristic may relate to a cluster of search interests. In an example, second routing algorithm 140 may be based on a cluster of search interests labeled "movies". In an example, as node 102 receives request 148, node 102 may be configured to determine that particular nodes include data relating to a cluster of search interests. For example, node 102 may be configured to determine that nodes 104, 108 and 112 include data relating to the cluster of search interests labeled "movies". In this example, node 102 may be configured to make this determination based on a user informing node 102 that nodes 104, 108 and 112 include data relating to "movies". In the example, algorithm 142 may be adapted to generate second routing algorithm 140 based on the topology and the cluster of search interests labeled "movies" to include the path 104-108-112-106-110-114-116. In the example, second routing algorithm 142 may be adapted to instruct node 102 to search nodes that have previously stored data related to the requested cluster of search interests prior to nodes that did not previously store data relating to the requested cluster of search interests.

In an example, node 102 may be configured to receive request 148 from user 146. Based, at least in part, on results for request 148 received from other nodes, and user input, algorithm 142 may be adapted to generate clusters of search interests. In an example, algorithm 142 may be adapted to provide user 102 with an interface including a defined list of clusters of search interests. In the example, request 148 may include one of the clusters. For example, algorithm 142 may be adapted to provide user 102 with a list of clusters of search interests such as "movies", "television", "music", etc. In some examples, request 148 may include a selection of the cluster and a keyword.

In an example, algorithm 142 may be adapted to update one of the routing algorithms based on another of the routing algorithms. For example, second routing algorithm 140 may be based on an interest and third routing algorithm 150 may be based on a communication delay in network 118. In response to request 148, algorithm 142 may be adapted to update second routing algorithm 140 based on third routing algorithm 150. In this way, second routing algorithm 140 may be based on a user's interest and based on communication delay in network 118. For example, second routing algorithm 140 may include a path of nodes including data relating to movies and where nodes with the fastest response times are listed prior to other nodes.

Among other benefits, system 100 may be effective to learn search styles of users and maximize an efficiency of searching for data in a peer to peer network. In a peer to peer network, nodes frequently include information focusing on a particular cluster of search interests. Search processing speed may be increased in that, among other things, searching of a network may be performed in nodes more likely to have requested data prior to other nodes. Instead of searching the same path of nodes for every search request, system 100 may generate and use different paths that may maximize the efficiency of providing responses for search requests. Each node may have routing algorithms and paths defined for users of the respective node. For example, in one node a "film" routing algorithm may be generated while in another node a "music" routing algorithm may be generated.

Figure 2:
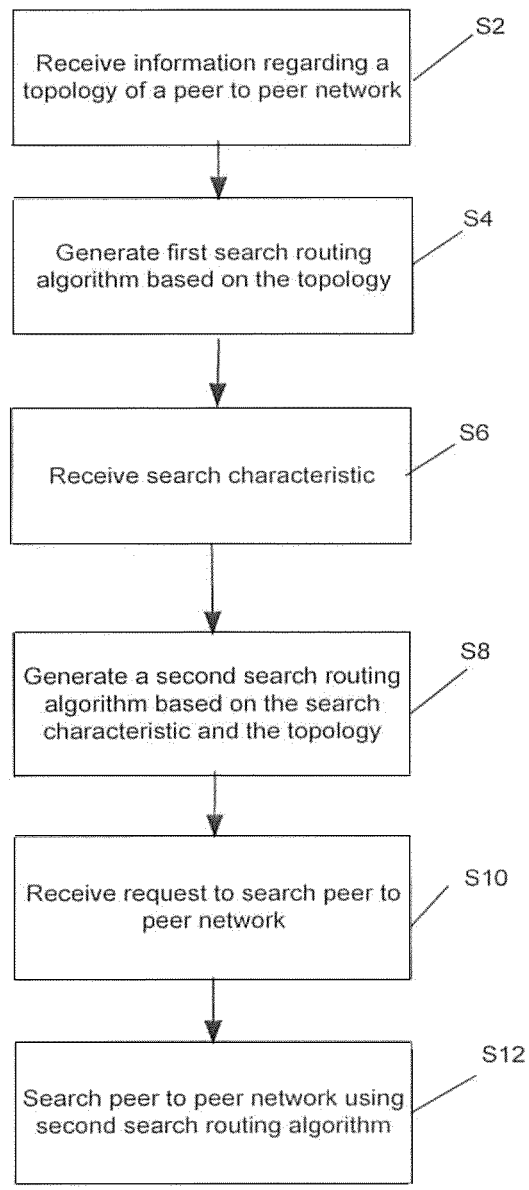
FIG. 2 depicts a flow diagram for example processes for implementing a peer to peer search routing algorithm.

FIG. 2 depicts a flow diagram for example processes for implementing a peer to peer search routing algorithm in accordance with at least some embodiments described herein. The process in FIG. 2 could be implemented using, for example, system 100 discussed above. An example process may include one or more operations, actions, or functions as illustrated by one or more of blocks S2, S4, S6, S8, S10 and/or S12. Although illustrated as discrete blocks, various blocks may be divided into additional blocks, combined into fewer blocks, or eliminated, depending on the desired implementation. Processing may begin at block S2.

At block S2, a processor may be configured to receive information regarding a topology of a peer to peer network. Processing may continue from block S2 to block S4.

At block S4, the processor may be configured to generate a first search routing algorithm based on the topology. Processing may continue from block S4 to block S6.

At block S6, the processor may be adapted to receive a search characteristic. Processing may continue from block S6 to block S8.

At block S8, the processor may be configured to generate a second search routing algorithm based on the search characteristic and the topology. Processing may continue from block S8 to block S10.

At block S10, the processor may be configured to receive a request to search the peer to peer network. Processing may continue from block S10 to block S12.

At block S12, the processor may be configured to search the peer to peer network using the second search routing algorithm.

Figure 3:
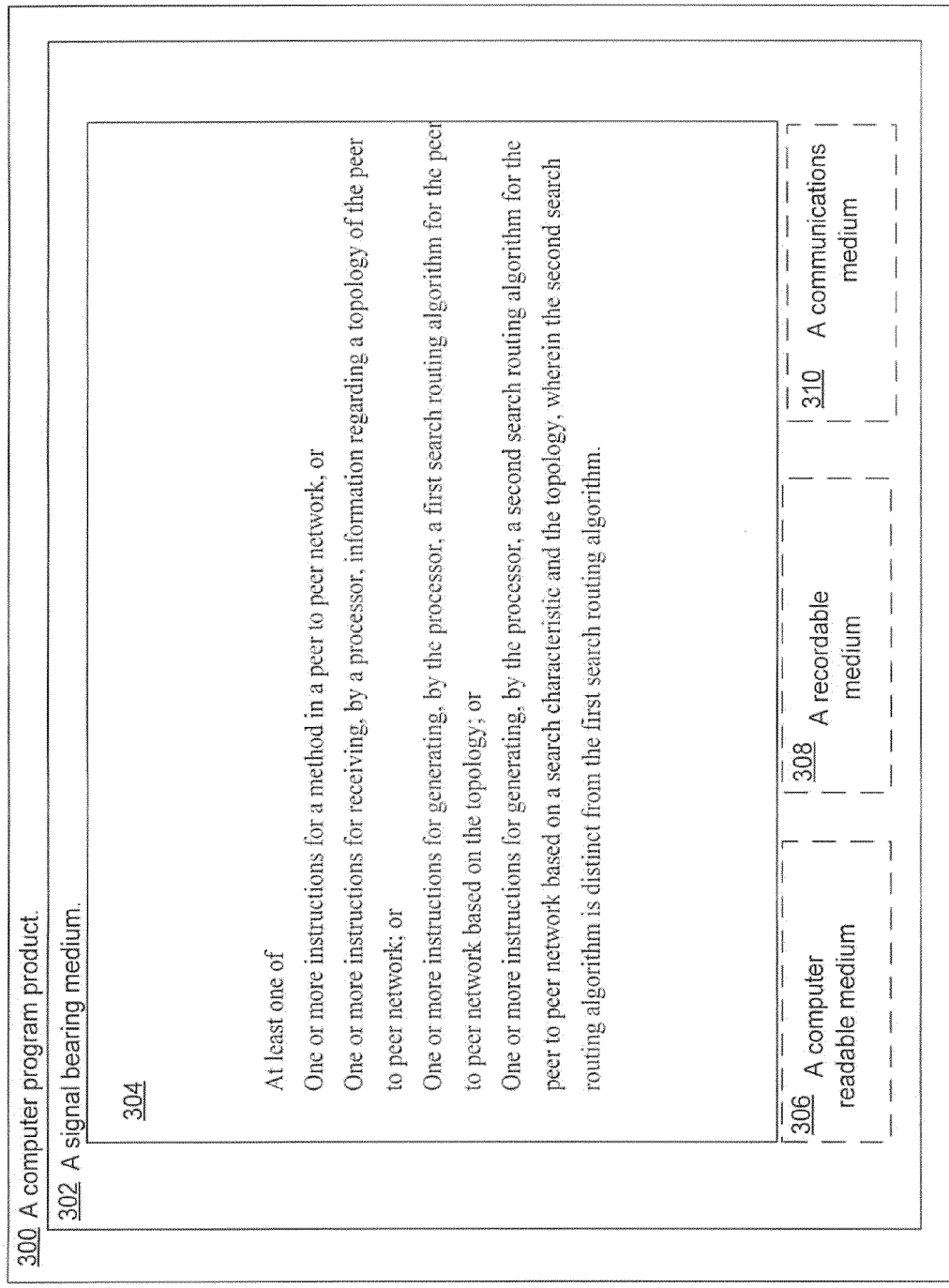
FIG. 3 illustrates computer program products for implementing a peer to peer search routing algorithm.

FIG. 3 illustrates computer program products 300 implementing a peer to peer search routing algorithm arranged according to at least some embodiments described herein. Program product 300 may include a signal bearing medium 302. Signal bearing medium 302 may include one or more instructions 304 that, when executed by, for example, a processor, may provide the functionality described above with respect to FIGS. 1-2. Thus, for example, referring to system 100, one or more of nodes 102, 104, 106, 108, 110, 112, 114 and/or 116 may undertake one or more of the blocks shown in FIG. 3 in response to instructions 304 conveyed to the system 100 by medium 302.

In some implementations, signal bearing medium 302 may encompass a computer-readable medium 306, such as, but not limited to, a hard disk drive, a Compact Disc (CD), a Digital Video Disk (DVD), a digital tape, memory, etc. In some implementations, signal bearing medium 302 may encompass a recordable medium 308, such as, but not limited to, memory, read/write (R/W) CDs, R/W DVDs, etc. In some implementations, signal bearing medium 302 may encompass a communications medium 310, such as, but not limited to, a digital and/or an analog communication medium (e.g., a fiber optic cable, a waveguide, a wired communications link, a wireless communication link, etc.). Thus, for example, program product 300 may be conveyed to one or more modules of the system 100 by an RF signal bearing medium 302, where the signal bearing medium 302 is conveyed by a wireless communications medium 310 (e.g., a wireless communications medium conforming with an IEEE 802.11 standard).

Figure 4:
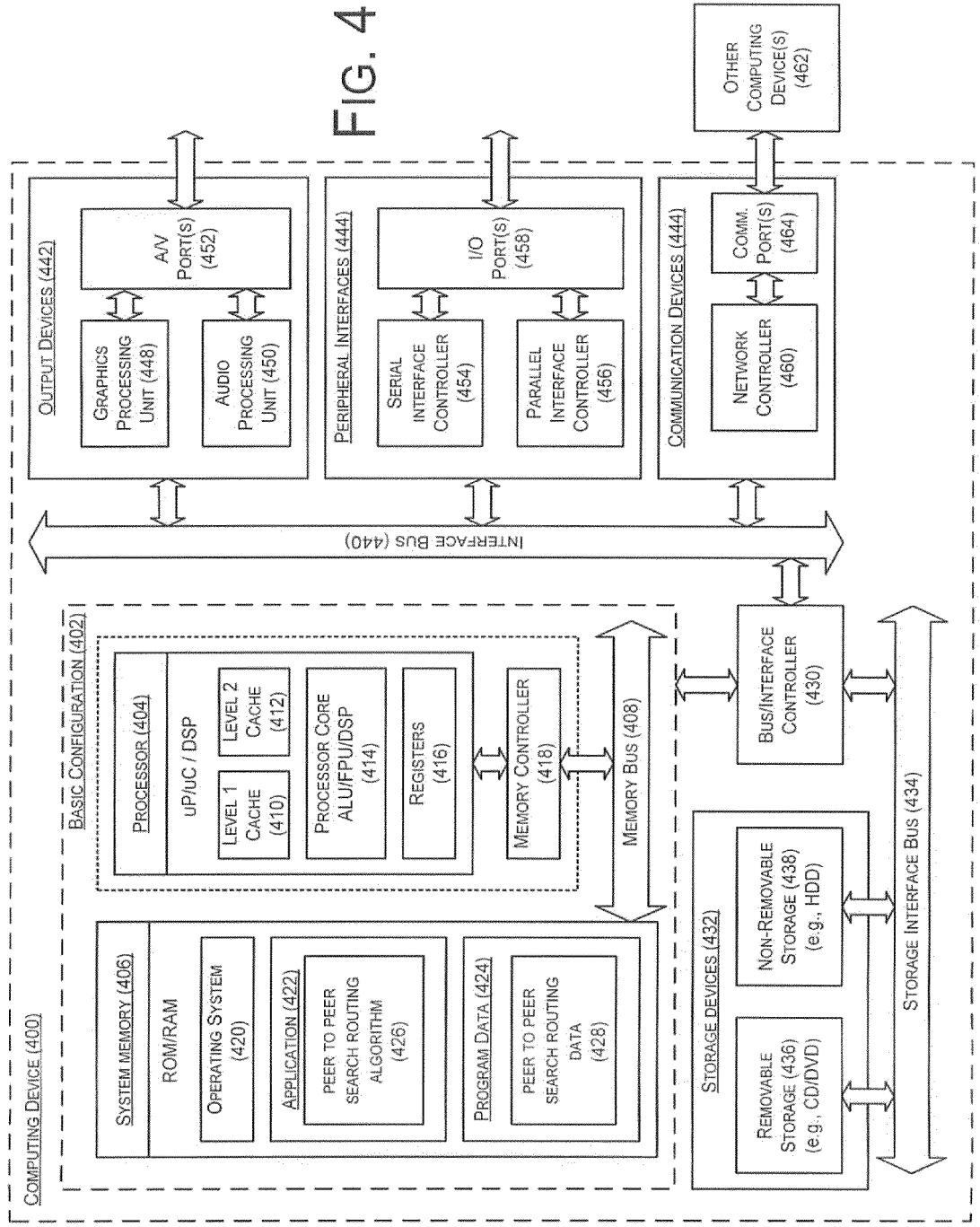
FIG. 4 is a block diagram illustrating an example computing device that is arranged to perform a peer to peer search routing algorithm.

FIG. 4 is a block diagram illustrating an example computing device 400 that is arranged to implement a peer to peer search routing algorithm according to at least some embodiments described herein. In a very basic configuration 402, computing device 400 typically includes one or more processors 404 and a system memory 406. A memory bus 408 may be used for communicating between processor 404 and system memory 406.

Depending on the desired configuration, processor 404 may be of any type including but not limited to a microprocessor (µP), a microcontroller (µC), a digital signal processor (DSP), or any combination thereof. Processor 404 may include one more levels of caching, such as a level one cache 410 and a level two cache 412, a processor core 414, and registers 416. An example processor core 414 may include an arithmetic logic unit (ALU), a floating point unit (FPU), a digital signal processing core (DSP Core), or any combination thereof. An example memory controller 418 may also be used with processor 404, or in some implementations memory controller 418 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more applications 422, and program data 424.

Application 422 may include a peer to peer search routing algorithm 426 that is arranged to perform the functions as described herein including those described previously with respect to FIGS. 1-3. Program data 424 may include peer to peer search routing data 428 that may be useful for implementing a peer to peer search routing algorithm as is described herein. In some embodiments, application 422 may be arranged to operate with program data 424 on operating system 420 such that a peer to peer search routing algorithm may be provided. This described basic configuration 402 is illustrated in FIG. 4 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (e.g., output devices 442, peripheral interfaces 444, and communication devices 446) to basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method in a peer to peer network, the peer to peer network including a plurality of nodes in communication, the method comprising:

receiving, by a processor, information regarding a topology of the peer to peer network;

generating, by the processor, a first search routing algorithm for the peer to peer network based on the topology, wherein the first search routing algorithm defines a first order to search the nodes for data in response to a request; and generating, by the processor, a second search routing algorithm for the peer to peer network based on a search characteristic and the topology, wherein the second search routing algorithm defines a second order to search the nodes for the data in response to the request, wherein the second order identifies at least a first node of the plurality of nodes to be searched for the data prior to a second node of the plurality of nodes, and the second search routing algorithm is distinct from the first search routing algorithm.

2. The method as recited in claim 1, further comprising receiving the search characteristic from a user.

3. The method as recited in claim 1, further comprising:

receiving, by the processor, the request for the data; and searching, by the processor, the network for the data using the second search routing algorithm.

4. The method as recited in claim 3, further comprising:

sending a list of clusters of search interests to a user; and wherein the request for the data includes at least one of the clusters and a keyword.

5. The method as recited in claim 1, wherein the search characteristic is a first search characteristic, and the method further comprises:

generating, by the processor, a third search routing algorithm based on the topology and a second search characteristic, wherein the third search routing algorithm is distinct from the first and second search routing algorithms, and the third search routing algorithm defines a third order to search the nodes for the data in response to the request, wherein the third order identifies at least a third node of the plurality of nodes to be searched for the data prior to a fourth node of the plurality of nodes.

6. The method as recited in claim 5, further comprising updating, by the processor, the second search routing algorithm based on the third search routing algorithm.

7. The method as recited in claim 1, wherein the search characteristic relates to a communication delay in the network or a cluster of search interests.

8. The method as recited in claim 1, wherein the search characteristic relates to a cluster of search interests, and generating the second search routing algorithm includes:

sending another request to the nodes in the peer to peer network, determining at least one particular node effective to store data relating to the search characteristic; and generating the second search routing algorithm based on the particular node.

9. The method as recited in claim 8, wherein the second search routing algorithm includes a path listing nodes and the particular node is listed in the path prior to other nodes in the peer to peer network.

10. A node in a peer to peer network, the network including a plurality of nodes effective to be in communication, the node comprising:
- a memory;
- a processor in communication with the memory, wherein the processor is effective to
  - receive information regarding a topology of the peer to peer network;
  - generate a first search routing algorithm for the peer to peer network based on the topology, wherein the first search routing algorithm defines a first order to search the nodes for data in response to a request;
  - store the first search routing algorithm in the Memory;
  - generate a second search routing algorithm for the peer to peer network based on a search characteristic and the topology, wherein the second search routing algorithm is distinct from the first search routing algorithm, and wherein the second search routing algorithm defines a second order to search the nodes for the data in response to the request, wherein the second order identifies at least a first node of the plurality of nodes to be searched for the data prior to a second node of the plurality of nodes; and
  - store the second search routing algorithm in the memory.

11. The node as recited in claim 10, wherein the processor is further effective to receive the search characteristic from a user.

12. The node as recited in claim 10, wherein the processor is further effective to receive the request for the data and search the peer to peer network for the data based on the second search routing algorithm.

13. The node as recited in claim 12, wherein the processor is further effective to
- send a list of clusters of search interests to a user; and
- wherein the request includes at least one of the clusters and a keyword.

14. The node as recited in claim 10, wherein the search characteristic is a first search characteristic, and the processor is further effective to generate a third search routing algorithm based on the topology and a second search characteristic, wherein the third search routing algorithm is distinct from the first and second search routing algorithm and the third search routing algorithm defines a third order to search the nodes for the data in response to the request, wherein the third order identifies at least a third node of the plurality of nodes to he searched for the data prior to a fourth node of the plurality of nodes.

15. The node as recited in claim 14, wherein the processor is further effective to update the second search routing algorithm based on the third search routing algorithm.

16. The node as recited in claim 10, wherein the search characteristic relates to a delay in the network or a cluster of search interests.

17. The node as recited in claim 10, wherein
- the search characteristic relates to a cluster of search interests; and
- the processor is effective to generate the second search routing algorithm by being effective to
  - send another request to the nodes in the peer to peer network,
  - determine at least one particular node effective to store data relating to the search characteristic; and
  - generate the second search routing algorithm based on the particular node.

18. The node as recited in claim 17, wherein the second search routing algorithm includes a path .listing nodes and the particular node is listed in the path prior to other nodes in the peer to peer network.

19. A peer to peer network comprising:
- a first node, the first node including
  - a first memory, and
  - a first processor in communication with the first memory, wherein the first processor is effective to
    - receive information regarding a topology of the peer to peer network,
    - generate a first search routing algorithm for the peer to peer network based on the topology, wherein the first search routing algorithm defines a first order to search the nodes for data in response to a request,
    - store the first search routing algorithm in the first memory,
    - generate a second search routing algorithm for the peer to peer network based on a first search characteristic and the topology, wherein the second search routing algorithm defines a second order to search the nodes for the data in response to the request. wherein the second order identifies at least a first node of the plurality of nodes to be searched for the data prior to a second node of the plurality of nodes, and the second search routing algorithm is distinct from the first search routing algorithm, and
    - store the second search routing algorithm in the first memory;
- a second node effective to be in communication with the first node, the second node including
  - a second memory,
  - a second processor in communication with the second memory, wherein the second processor is effective to
    - receive the information regarding the topology of the peer to peer network,
    - generate a third search routing algorithm for the peer to peer network based on the topology, wherein the third search routine algorithm defines a third order to search the nodes for the data in response to the request,
    - store the third search routing algorithm in the second memory;
    - generate a fourth search routing algorithm for the peer to peer network based on a second search characteristic and the topology, wherein the fourth search routing algorithm defines a fourth order to search the nodes for the data in response to the request, wherein the fourth order identifies at least a third node of the plurality of nodes to be searched for the data prior to a fourth node of the plurality of nodes, and the fourth search routing algorithm is distinct from the third search routing algorithm, and
    - store the fourth search routing algorithm in the second memory; and
- a third node effective to be in communication with at least one of the first and the second node, the third node including
  - a third memory,
  - a third processor in communication with the third memory, wherein the third processor is effective to
    - receive the information regarding the topology of the peer to peer network,
    - generate a fifth search routing algorithm for the peer to peer network based on the topology, wherein the fifth search routing algorithm defines a fifth order to search the nodes for the data in response to the request, store the fifth search routing algorithm in the third memory;

generate a sixth search routing algorithm for the peer to peer network based on a third search characteristic and the topology, wherein the sixth search routing algorithm defines a sixth order to search the nodes for the data in response to the request, wherein the sixth order identifies at least a fifth node of the plurality of nodes to be searched for the data prior to a sixth node of the plurality of nodes, and the sixth search routing algorithm is distinct from the fifth search routing algorithm, and store the sixth search routing algorithm in the third memory.

20. The peer to peer network as recited in claim 19, wherein the first processor is effective to send a list of clusters of search interests to a user;

receive the request for the data including at least one of the clusters and a keyword; and search the network for the data based on the second search routing algorithm.

* * * * *